United States Patent
Tanaka

(10) Patent No.: US 9,024,897 B2
(45) Date of Patent: May 5, 2015

(54) INSTRUCTION INPUT DEVICE AND RECORDING MEDIUM

(71) Applicant: Tomoji Tanaka, Aichi (JP)

(72) Inventor: Tomoji Tanaka, Aichi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 123 days.

(21) Appl. No.: 13/775,431

(22) Filed: Feb. 25, 2013

(65) Prior Publication Data

US 2013/0241853 A1    Sep. 19, 2013

(30) Foreign Application Priority Data

Mar. 14, 2012  (JP) ................. 2012-058024

(51) Int. Cl.
  *G06F 3/041* (2006.01)
  *G06F 3/0488* (2013.01)
  *G06F 3/044* (2006.01)

(52) U.S. Cl.
  CPC .............. *G06F 3/041* (2013.01); *G06F 3/0488* (2013.01); *G06F 3/0416* (2013.01); *G06F 3/044* (2013.01); *G06F 2203/04108* (2013.01)

(58) Field of Classification Search
  CPC ....... G06F 3/041; G06F 3/044; G06F 3/0416; G06F 2203/04108
  USPC .................................................. 345/173–179
  See application file for complete search history.

(56) References Cited

U.S. PATENT DOCUMENTS

| | | |
|---|---|---|
| 2002/0039092 A1 | 4/2002 | Shigetaka |
| 2009/0021491 A1 | 1/2009 | Kawamura |
| 2012/0026200 A1 | 2/2012 | Okada et al. |
| 2013/0157726 A1 | 6/2013 | Miyazaki et al. |

FOREIGN PATENT DOCUMENTS

| | | |
|---|---|---|
| JP | 2000-039964 A | 2/2000 |
| JP | 2002-082765 A | 3/2002 |
| JP | 2012-008923 A | 1/2012 |
| JP | 2012-014648 A | 1/2012 |

(Continued)

OTHER PUBLICATIONS

Office Action (Notification of Reasons for Refusal) issued on Feb. 4, 2014, by the Japan Patent Office in corresponding Japanese Patent Application No. 2012-058024, and an English Translation of the Office Action. (5 pages).

*Primary Examiner* — Regina Liang
(74) *Attorney, Agent, or Firm* — Buchanan Ingersoll & Rooney PC

(57) ABSTRACT

An instruction input apparatus comprising: a display being provided with a display screen; an electrostatic touch panel being deposited on the front of the display screen on the display, the touch panel being configured to input instructions to the instruction input apparatus; an approach sensor being configured to detect a user's hand approaching to a part of frame of the touch panel; a coordinate identification portion being configured to identify the coordinate of a contact position at which the user touches on the touch panel; and a controller being configured to, if the approach sensor detects the user's hand approaching to the part of frame of the touch panel, change a contact detectable area of the touch panel so that the contact detectable area will exclude the coordinate of the user's contact position which is identified by the coordinate identification portion.

10 Claims, 12 Drawing Sheets

(56) References Cited

FOREIGN PATENT DOCUMENTS

| JP | 2012-049688 A | 3/2012 |
| JP | 2012-008923 | * 12/2012 |
| WO | WO 2007/097414 A1 | 8/2007 |

* cited by examiner

INSTRUCTION INPUT DEVICE AND RECORDING MEDIUM

This application claims priority under 35 U.S.C. §119 to Japanese Patent Application No. 2012-058024 filed on Mar. 14, 2012, the entire disclosure of which is incorporated herein by reference in its entirety.

BACKGROUND OF THE INVENTION

1. Field of the Invention

The present invention relates to: an instruction input device to be embedded on operation panels of tablet computer terminals, image forming apparatuses, and the like, the operation panels being configured to input instructions to the tablet computer terminals and the image forming apparatuses, the operation panels being deposited on the front of display screens of displays, such as liquid crystal displays, of the tablet computer terminals and the image forming apparatuses; and a recording medium with a program stored thereon to make a computer of the instruction input device change a contact detectable area.

2. Description of the Related Art

The following description sets forth the inventor's knowledge of related art and problems therein and should not be construed as an admission of knowledge in the prior art.

In recent years, it has become very common for display, such as liquid crystal displays, to have electrostatic touch panels. With the trend toward less frame width and flatter design, electrostatic touch panels fully covered with glass, including undetectable areas thereof, have become common.

At the same time, with this growing trend, when operating such an electrostatic touch panel by touch controls, users have encountered a problem of mistouching on the touch panel because they tend to accidentally touch with their palms of hand, at a position of the margin surrounding the electrostatic touch panel, i.e., at a position close to a side of frame of the electrostatic touch panel.

Specifically, there are large-size touch panels to be loaded on liquid crystal displays for fixed machines such as multi-functional digital image forming apparatuses also referred to as MFPs, having various functions of copier, printer, facsimile, and scanner, and when operating such a touch panel, users have encountered a problem of mistouching on the touch panel more often because they tend to accidentally touch with their palms of hand, at a position close to a side of frame of such a large-size touch panel while only trying to reach keys spreading the hands with the palms down customarily.

Furthermore, some liquid crystal displays have hardware keys at a position close to touch panels, and when operating such a touch panel, users have also encountered a problem of mistouching on the touch panel because they tend to accidentally touch at a position of the margin surrounding the touch panel while only trying to reach hardware keys.

To address the problem of mistouch, Japanese Unexamined Patent Publication No. 2002-082765 discloses a technique to perform calculation by a capacitance input portion, using a maximum value and values before and after recording the maximum value at a detection point, and cancel generated coordinate data if the calculated value is less than a first threshold.

According to Japanese Unexamined Patent Publication No. 2002-082765, a conventional instruction input device simply judges whether or not a user touched on a touch panel with his/her palm of hand when detecting the contact. There is no description such that the conventional instruction input device identifies the coordinate of a contact position quickly after detecting a user's touching on the touch panel; i.e., even by applying this invention, it is not possible to achieve an instruction input device which identifies the coordinate of a contact position quickly after detecting a user's touching on a touch panel.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an instruction input apparatus comprising:

a display being provided with a display screen;

an electrostatic touch panel being deposited on the front of the display screen on the display, the touch panel being configured to input instructions to the instruction input apparatus;

an approach sensor being configured to detect a user's hand approaching to a part of frame of the touch panel;

a coordinate identification portion being configured to identify the coordinate of a contact position at which the user touches on the touch panel; and a controller being configured to, if the approach sensor detects the user's hand approaching to the part of frame of the touch panel, change a contact detectable area of the touch panel so that the contact detectable area will exclude the coordinate of the user's contact position which is identified by the coordinate identification portion.

A second aspect of the present invention relates to a non-transitory computer-readable recording medium with a program stored thereon to make a computer of an instruction input device comprising:

a display being provided with a display screen; and an electrostatic touch panel being deposited on the front of the display screen on the display, the touch panel being configured to input instructions to the instruction input apparatus, execute:

detecting a user's hand approaching to a part of frame of the touch panel;

identifying the coordinate of a contact position at which the user touches on the touch panel; and if the user's hand approaching to the part of frame of the touch panel is detected, changing a contact detectable area of the touch panel so that the contact detectable area will exclude an identified coordinate of the user's contact position.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, an embodiment of the present invention will be described with reference to the accompanying drawings.

Figure 1:
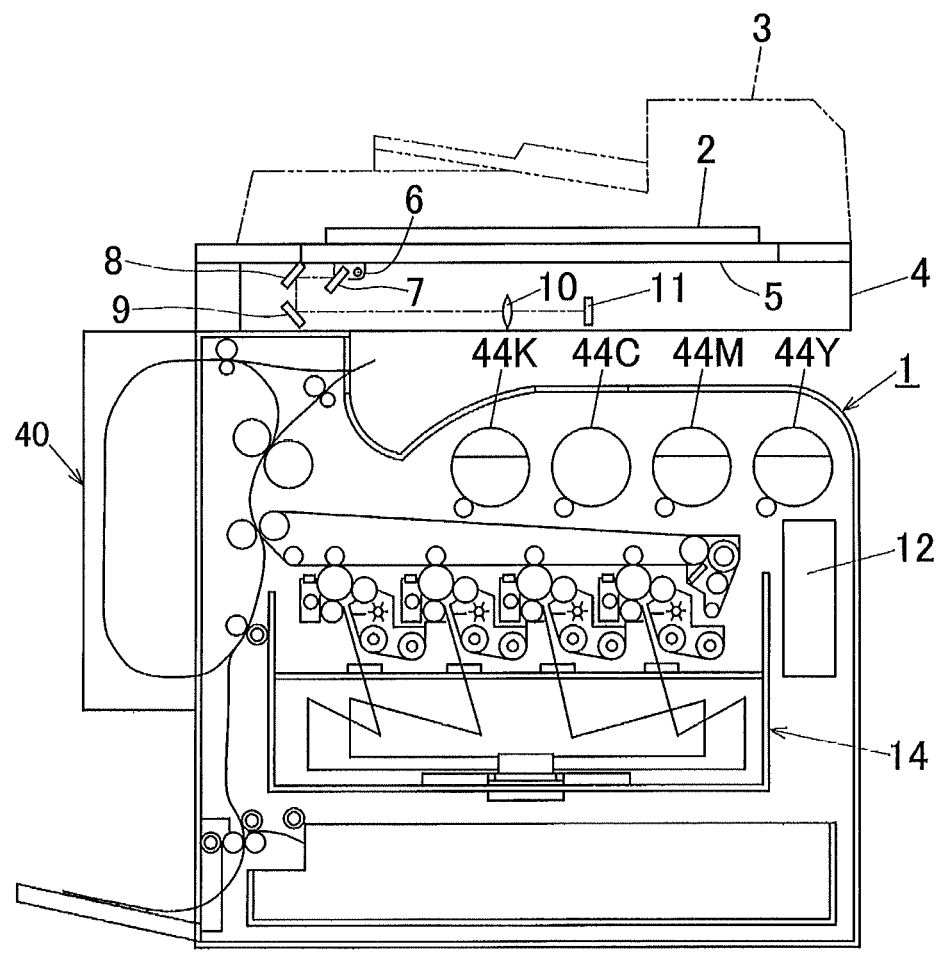
FIG. 1 is an overview schematically illustrating a configuration of a digital color multifunctional machine having an instruction input device according to one embodiment of the present invention.
Figure 2:
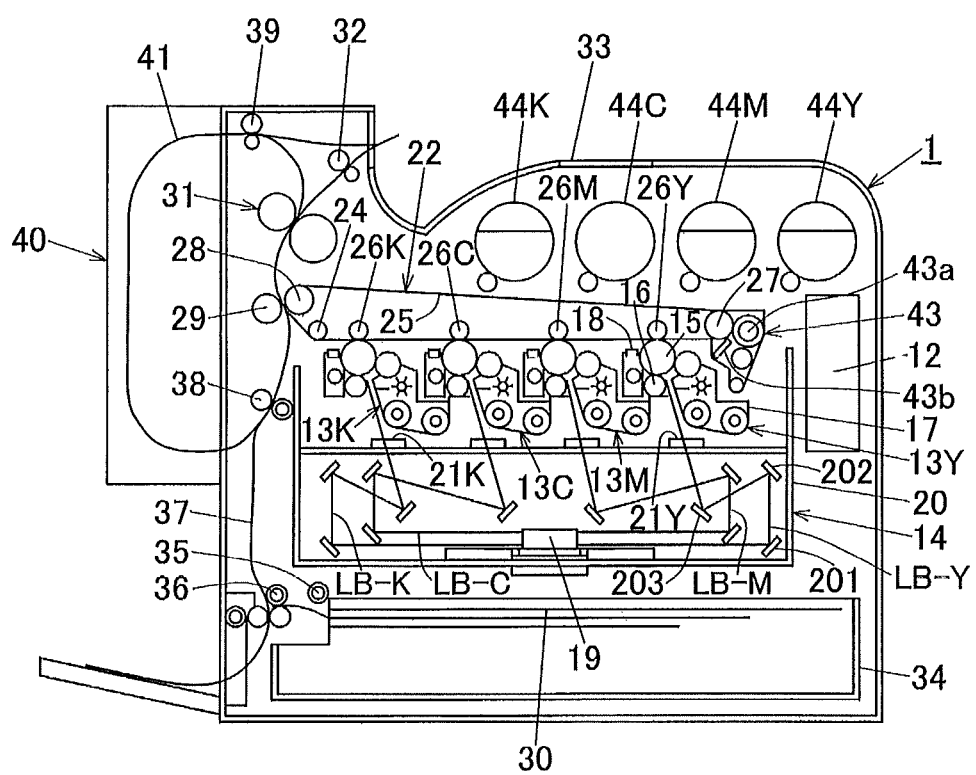
FIG. 2 is an explanatory view illustrating details of the digital color multifunctional machine of FIG. 1.

FIG. 1 illustrates a tandem digital color multifunctional machine which serves as an image forming apparatus having an instruction input device according to one embodiment of the present invention; FIG. 2 is an explanatory view illustrating details of an engine of the digital color multifunctional machine.

In general, the digital color multifunction machine is referred to as a multifunctional peripheral (MFP) having various functions to execute: scan jobs for reading an image on a document placed on the MFP and storing the image read out from the document on a memory such as a hard disk drive (HDD); copy jobs for printing (making a copy of) the image read out from the document on a sheet of paper; print jobs for printing an object on a sheet of paper in accordance with a print instruction received from an external terminal such as a personal computer; facsimile jobs for receiving a facsimile image from a facsimile apparatus and storing it on the memory; print jobs for printing the image stored on the memory on a sheet of paper; and other jobs.

As illustrated in FIGS. 1 and 2, the body of an apparatus 1 represents a tandem digital color multifunctional machine. The digital color multifunctional machine has an automatic document feeder (ADF) 3 on the top thereof and an image reader at a predetermine position thereof. The automatic document feeder 3 automatically conveys a document 2 (a collection of sheets of paper) one by one, separately; the image reader 4 reads an image on a sheet of paper provided by the automatic document feeder 3. More specifically, in the image reader 4, the document 2 placed on a platen glass 5 is exposed with light from a light source 6, and a light figure reflected from the document 2 is conveyed to an image reading element 11 such as a CCD, by way of an reduction optical system consisting of a full-rate mirror 7, half-rate mirrors 8 and 9, and an imaging lens 10, and the image reading element 11 reads the light figure reflected from the document 2 at a predetermined dot per millimeter (16 dots/mm, for example) to obtain a color light figure therefrom.

The image reader 4 has: a scanner function for reading out an image from a document so that it can be transmitted by facsimile; a Scan-to-email function for reading out an image from a document so that it can be transmitted by email; a Scan-to-box function for reading out an image from a document so that it can be stored on a box that is a memory area; and other functions. And the optical color image obtained by the image reader 4, which is expressed by reflection rates of the three primary colors: red (R) green (G), and blue (B) (8-bits long per each color), for example, is transmitted to an image processor 12. The image processor 12 performs predetermined processing such as shading correction, registration, brightness/color space conversion, gamma correction, frame elimination, and color/position edit, on the reflection ratios obtained from the document 2. The image processor 12 also performs the predetermined processing on images received from personal computers and other machines. After performing the predetermined processing, the image processor 12 further converts the image data obtained by the image processor 12 to color and tone reproduction data of the four toner colors: yellow (Y), magenta (M), cyan (C), and black (K) (8-bit long per each color) and transmits it to a print head 14 of image forming units 13Y, 13M, 13C, and 13K for the yellow (Y), magenta (M), cyan (C), and black (K) toner colors, respectively. In accordance with the color and tone reproduction data from the image processor 12, the print head 14, which serves as a light emitter, emits laser beams LB to form an electrostatic latent image.

In the body of the tandem digital color multifunctional machine 1, as illustrated in FIG. 2, there are the image forming units 13Y, 13M, 13C, and 13K for the yellow (Y), magenta (M), cyan (C), and black (K) toner colors, respectively, as described above, being horizontally arranged in a line at a regular interval. The image forming units 13Y, 13M, 13C, and 13K have a common configuration with each other. They are primarily comprised of: a photoreceptor drum 15 serving as an image carrier rotating at a predetermined speed; a charging roller 16 charging the entire surface of the photoreceptor drum 15 uniformly in a first charging process; a print head 14 serving as a light emitter forming an electrostatic latent image of its own toner color on the surface of the photoreceptor drum 15 by exposing it with light thereto; a developer 17 developing the electrostatic latent image formed on the surface of the photoreceptor drum 15, with toner of its own toner color; and a cleaner 18 cleaning up the surface of the photoreceptor drum 15. In FIG. 2, the image forming units 13Y, 13M, 13C, and 13K share the one print head 14. The print head 14 is configured to emit laser beams LB-Y, LB-M, LB-C, and LB-K in accordance with the color and tone reproduction data, by controlling four semiconductor lasers which are not illustrated. Alternatively, as a matter of course, the image forming units 13Y, 13M, 13C, and 13K each may have one the print head 14.

The laser beams LB-Y, LB-M, LB-C, and LB-K from the four semiconductor lasers are directed to one rotating polygon mirror 19 then deflected thereby. More specifically, while a pair of the laser beams LB-Y and LB-M is directed to one side of the rotary polygon mirror 19, while another pair of the laser beams LB-C and LB-K is directed to the other side of the rotary polygon mirror 19. As a result, the pair of the laser beams LB-Y and LB-M and the other pair of the laser beams LB-C and LB-K are deflected in the opposite directions to each other. After being deflected by the rotary polygon mirror 19, the laser beams LB-Y, LB-M, LB-C, and LB-K are further reflected by a plurality of reflecting mirrors 201, 202, and 203 in order by way of an f θ lens which is not illustrated. And being inserted obliquely upward from windows 21Y, 21M, 21C, and 21K, the laser beams LB-Y, LB-M, LB-C, and LB-K eventually arrive on the surfaces of the respective photoreceptor drums 15 of the image forming units 13Y, 13M, 13C, and 13K.

The one print head 14 shared by the image forming units 13Y, 13M, 13C, and 13K for the yellow (Y), magenta (M), cyan (C), and black (K) toner colors, respectively, receives image data of these toner colors from the image processor 12. And the laser beams LB-Y, LB-M, LB-C and LB-K from the print head 14 eventually arrive on the surfaces of the respective photoreceptor drums 15 of the image forming units 13Y, 13M, 13C, and 13K to form electrostatic latent images thereon.

In this embodiment of the present invention, the pair of the laser beams LB-Y and LB-M for the image forming units 13Y and 13M and the other pair of the laser beams LB-C and LB-K for the image forming units 13C and 13K are directed to the opposite sides of the rotary polygon mirror 19 to each other then deflected thereby, as illustrated in FIG. 2. Therefore, the pair of the laser beams LB-Y and LB-M and the other pair of the laser beams LB-C and LB-K arrive on the surface of the respective photoreceptor drums 15, running in the opposite scanning directions to each other.

Then the electrostatic latent images formed on the photoreceptor drums 15 are developed into toner images by the developer 17, with toner of the yellow (Y), magenta (M), cyan (C), and black (K) toner colors. Subsequently, the toner images of yellow (Y), magenta (M), cyan (C), and black (K), which are formed on the surface of the respective photoreceptor drums 15 of the image forming units 13Y, 13M, 13C, and 13K, are transferred in layers by a first transfer roller 26 onto an intermediate transfer belt 25 of an intermediate belt unit 22 arranged above the image forming units 13, 13M, 13C, and 13K. The intermediate transfer belt 25 is mounted around a driving roller 27, a backup roller 28, and a tension roller 24 at a constant tension. The driving roller 27 is driven by a dedicated driving motor featuring its perfect constant driving speed, which is not illustrated, and by this driving roller 27, the intermediate transfer belt 25 is driven circularly around the rollers in a fixed direction at a predetermined driving speed.

The layered toner images of yellow (Y), magenta (M), cyan (C), and black (K) on the intermediate transfer belt 25 are further transferred by a second transfer roller 29 pressing against the backup roller 28, onto a transfer sheet 30 serving as an object to have toner images fused thereon with pressure and electrostatic forces. The transfer sheet 30 holding the toner images is conveyed to a fuser 31 arranged right above. The second transfer roller 29, which is arranged by the side of the backup roller 28, is configured to transfer all the toner images at once on the transfer sheet 30 passing by when the transfer sheet 30 is conveyed upward. The transfer sheet 30 holding the toner images is subjected to fusing with pressure and heat by the fuser 31, and then outputted by a paper output roller 32 onto a paper output tray 33 arranged on the top of the body 1.

A paper feed cassette 34 holds sheets of a predetermined size, and as illustrated in FIG. 2, the transfer sheet 30 is initially provided from the paper feed cassette 34. Then it is conveyed to a registration roller 38 by a paper feed roller 35 and a pair of paper separation rollers 36 through a paper path 37, and suspended at the registration roller 38 for a while. The transfer paper 30, which is initially provided from the paper feed cassette 34, is conveyed by the registration roller 38, which rotates at a predetermined time, to a position of the second transfer process in the intermediate transfer belt 25. When making a full-color, both-sided copy using the digital color multifunction machine, the transfer sheet 30 holding toner images fused on one side is, instead of being output by the paper output roller 32 onto the paper output tray 33, oppositely directed by a switch back gate which is not illustrated, and conveyed to a double-sided sheet conveyance unit 40 by a pair of paper conveyance rollers 39. After being turned upside down by a pair of paper conveyance rollers (not illustrated) arranged on a paper path 4 of the both-sided sheet conveyance unit 40, the transfer sheet 30 arrives at the registration roller 38 again. After that, toner images are transferred and fused onto the other side of the transfer sheet 30 in the same manner, then output on the paper output tray 3. As illustrated in FIGS. 1 and 2, there are toner cartridges 44Y, 44M, 44C, and 44K containing toner to supply the respective developers 17 with toner of the yellow (Y), magenta (M), cyan (C), and black (K) toner colors, respectively.

Figure 3:
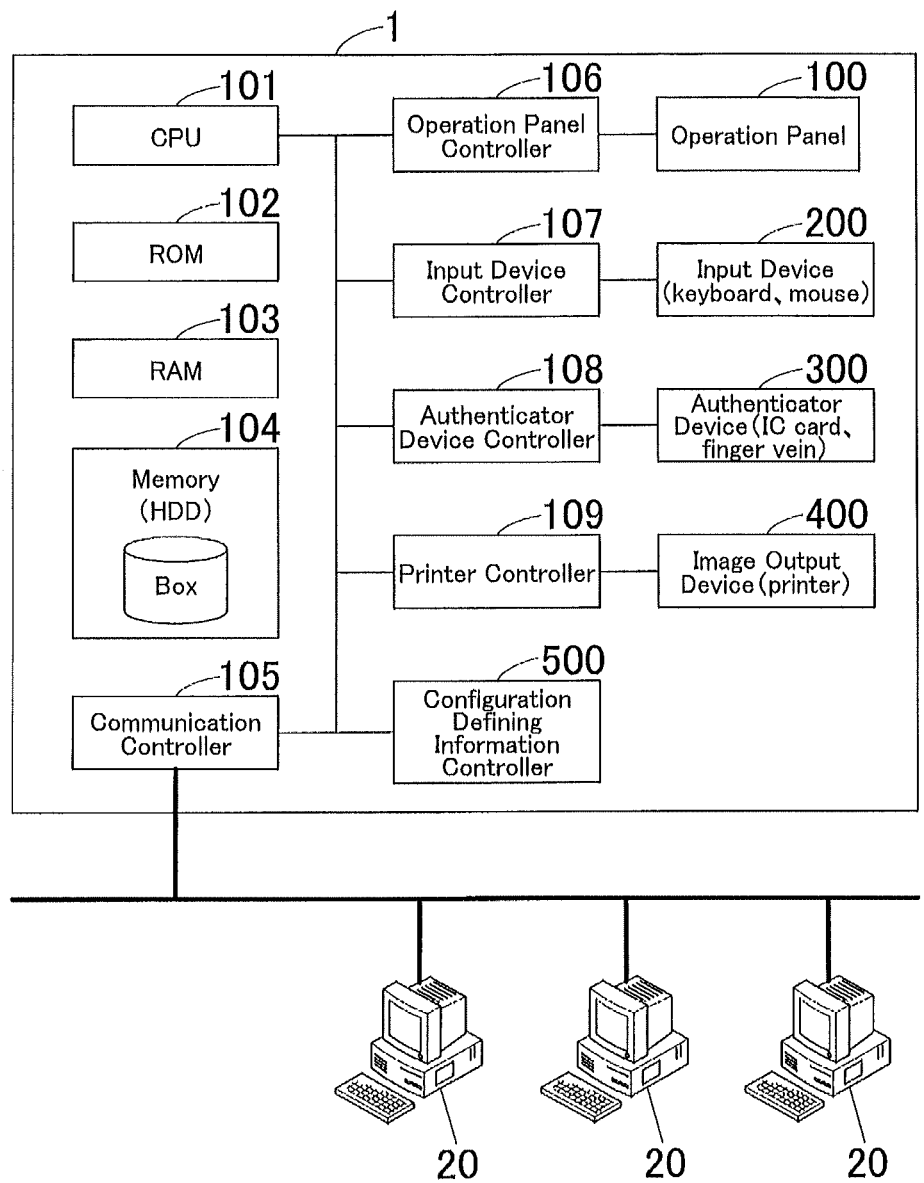
FIG. 3 is a block diagram illustrating a control system configuration of the digital color multifunctional machine of FIG. 1.

FIG. 3 is a block diagram illustrating a control system configuration of a digital color multifunctional machine according to one embodiment of the present invention.

As illustrated in FIG. 3, the digital color multifunctional machine is provided with an operation panel 100, an input device 200, an authenticator device 300, an image output device 400, and the like.

The operation panel 100 is provided with a display such as a liquid crystal display (LCD), a touch panel, and hardware keys. Further details thereof will be later described.

The input device 200 is comprised of a keyboard, a mouse, and the like which are not illustrated. The authenticator device 300 is comprised of a contact or contactless IC card authenticator, a finger vein authenticator, or the like; the image output device 400 implements the function of printing out images.

The digital color multifunctional machine is further provided with a CPU 101. Connected to a bus of the CPU 101 are: a ROM 102; a RAM 103; a memory 104 consisting of a hard disk drive (HDD); a communication controller 105; an operation panel controller 106; an input device controller 107; an authenticator device controller 108; a printer controller 109; a configuration defining information controller 500; and the like.

The CPU 101 controls all operations of the digital color multifunctional machine in a unified and systematic manner; the ROM 102 is a memory storing operation programs for the CPU 101; and the RAM 103 is a memory providing a work area for the CPU 101 to execute processing.

The memory 104 temporarily stores images received from print instructing computer terminals such as personal computers A, B, C, and D. The memory 104 also stores digitally-scanned images and the like on a memory area of the memory 104, which is also referred to as Box, and other various data such as applications.

The communication controller 105 exchanges data with the personal computers 20 and other external devices via a network.

The operation panel controller 106 controls the operation panel 100 to receive input, output, and other operations. More specifically, the operation panel controller 106 controls: the liquid crystal display to show and hide images thereon; an approach sensor to detect a user approaching thereto; a touch panel 1001 to change a contact detectable area (active area) and identify the coordinate of a contact position at which the liquid crystal display is touched; the hardware keys; and an LED indicator and/or a warning alarm to turn on and off.

The input device controller 107 controls the input device 200. The authentication controller 108 takes control of ensuring secure authentication of the entire digital color multifunctional machine by controlling the authentication 300. The printer controller 109 controls the image output device 400. The configuration defining information controller 500 controls information objects defined by the digital color multifunctional machine.

Figure 4:
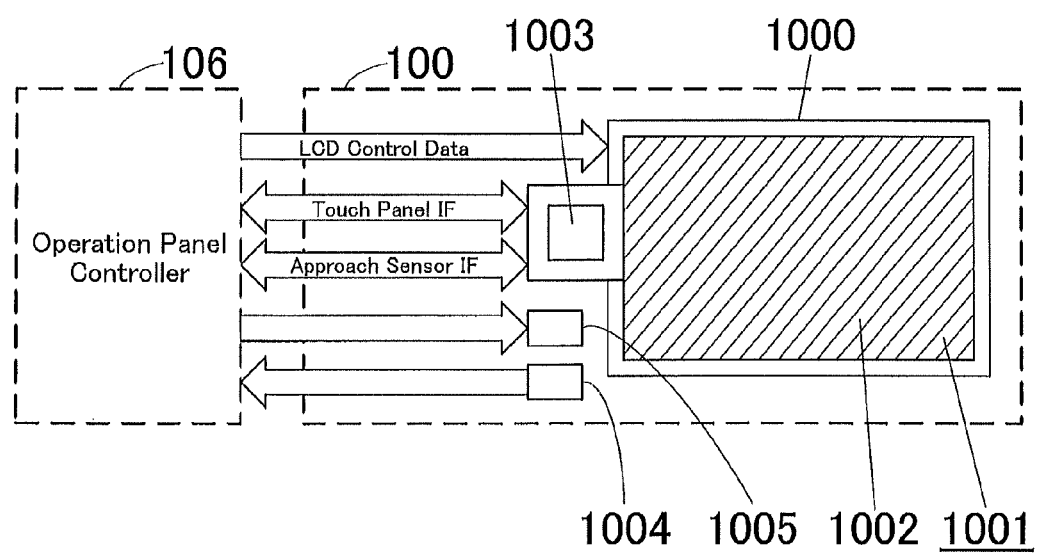
FIG. 4 is a block diagram illustrating an operation panel of the digital color multifunctional machine of FIG. 1, the operation panel having the instruction input device embedded thereon.

Hereinafter, a configuration of the operation panel 100 will be described with reference to FIG. 4.

The operation panel 100 is comprised of: a display 1000 such as a liquid crystal display (LCD); a touch panel 1001; a LED indicator which is not illustrated; hardware keys 1004; and the like. The touch panel 1001 is comprised of an integrated module having: a touch panel sensor 1002 including an approach sensor disposed on the front (upper surface) of a display screen of the display 1000; and a flexible printed circuit board (FPC board) with a micro-computer 1003 for touch panel control being installed thereon.

The liquid crystal display 1000, the touch panel 1001, and the hardware keys 1004 are connected to the operation panel controller 106. The operation panel controller 106 controls: the liquid crystal display 1000 to show and hide images thereon; the approach sensor; the touch panel 1001; the hardware keys 1004; and the indicator LED and/or a warning alarm to turn on and off.

FIG. 5 illustrates a detailed configuration example of the touch panel 1001 which is employed in this embodiment.

The touch panel 1001 is an electrostatic touch panel which is comprised of: an indium tin oxide (ITO) coated glass 52 with a transparent electrode 51 formed on the surface thereof; and a cover lens 5, which are sealed to each other.

Figure 5A:
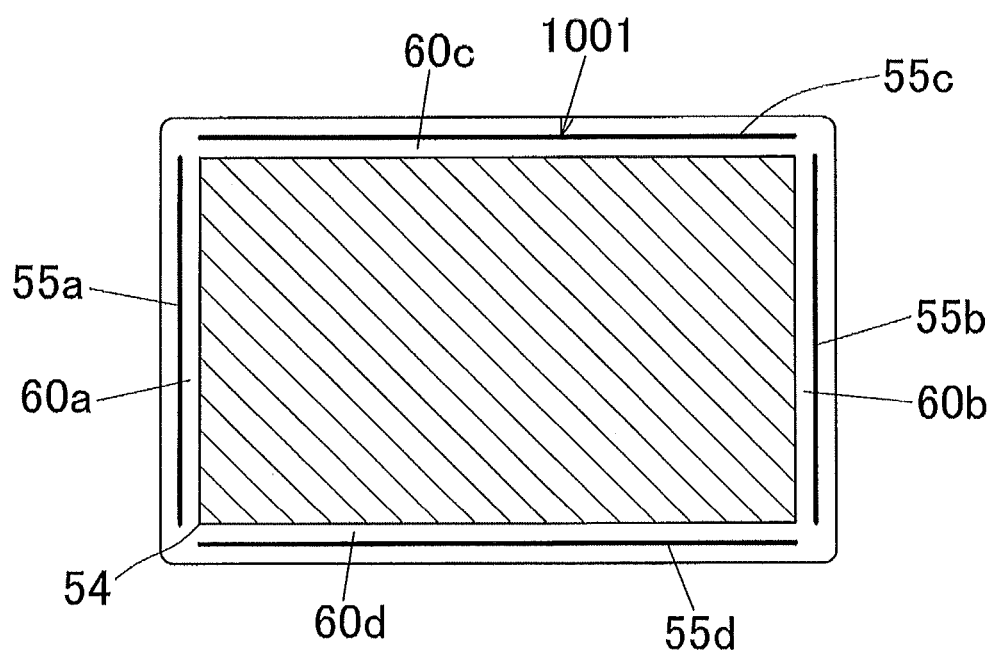
FIGS. 5A and 5B are view illustrating a detailed configuration example of a touch panel.
Figure 5B:
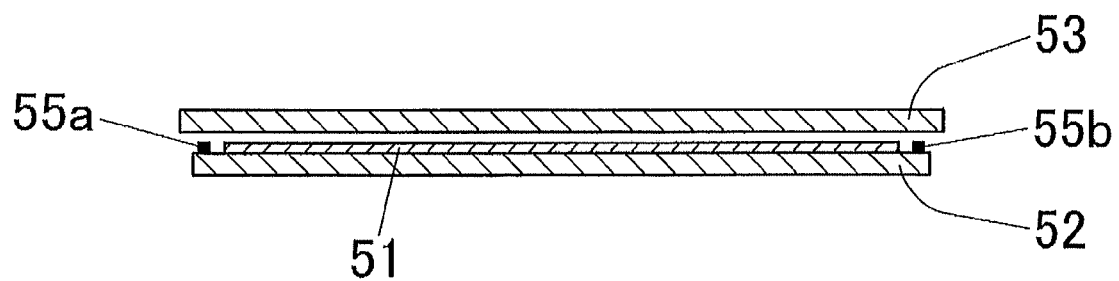

In a two-dimensional view of FIG. 5A, the touch panel 1001 has a contact detectable area 54, i.e., an active area, being formed in a square shape as illustrated as a box, in a mode such that the detectable area 54 exactly matches a liquid crystal display area (indicated by shades) of the touch panel 1001. In the margin surrounding the contact detectable area 54, ITO electrode lines, each having electrodes at both ends, are arranged on X-axis and Y-axis while being connected to a terminal of an approach sensor IC on the surface of the flexible printed circuit board mentioned above.

In general, the detection performance of a touch panel with electrode lines has a detection performance very sensitive to the effects of a conductor existing nearby, for its characteristics as an electrostatic sensor. In order to avoid such undesirable effects, it is necessary to keep a certain distance between the electrode lines and a conductor in the touch panel 1001. In a cross-sectional surface view of FIG. 5B, the ITO coated glass 52 in this embodiment has antenna patterns 55*a*, 55*b*, 55*c*, and 55*d* with different electrostatic characteristics for the approach sensor, being disposed on the surface of the ITO coated glass 52 itself at a position with a distance of about 3 millimeters from the electrode lines mentioned above, outside of the transparent electrode 51. The antenna patterns 55*a*, 55*b*, 55*c*, and 55*d* correspond to sides of frame 60*a*, 60*b*, 60*c*, and 60*d* on the left, right, top, and bottom of the contact detectable area 54 in a square shape, respectively. And the antenna patterns 55*a*, 55*b*, 55*c*, and 55*d* are connected to a terminal of the electrostatic approach sensor IC of the operation panel 100. This configuration allows the electrostatic approach sensor IC to detect a user's palm of hand approaching to the individual sides of frame 60*a*, 60*b*, 60*c*, and 60*d* of the touch panel 1001.

The antenna patters 55*a*, 55*b*, 55*c*, and 55*d* for the approach sensor are disposed on the surface of the ITO coated glass 52 with the transparent electrode 51 also being formed thereon, as described above, which contributes to a simple configuration and lower costs of the electrostatic touch panel.

Hereinafter, area reduction control of the touch panel 1001 according to one embodiment of the present invention, which is reducing the contact detectable area 54, will be described with reference to FIG. 6.

FIGS. 6A, 6B, 6C, and 6D illustrate how the contact detectable area 54 is reduced when an operator's palm of hand approaches to the sides of frame 60*a*, 60*b*, 60*c*, and 60*d* of the liquid crystal touch panel 1001, respectively.

Figure 6A:
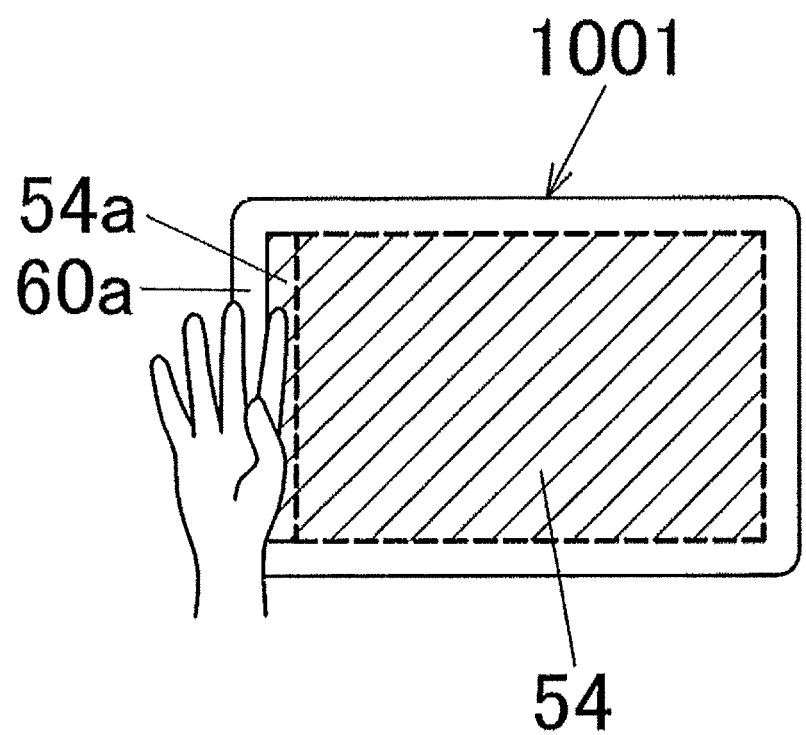
FIGS. 6A-6D are explanatory view illustrating area reduction control of the touch panel, which are reducing a contact detectable area.
Figure 6B:
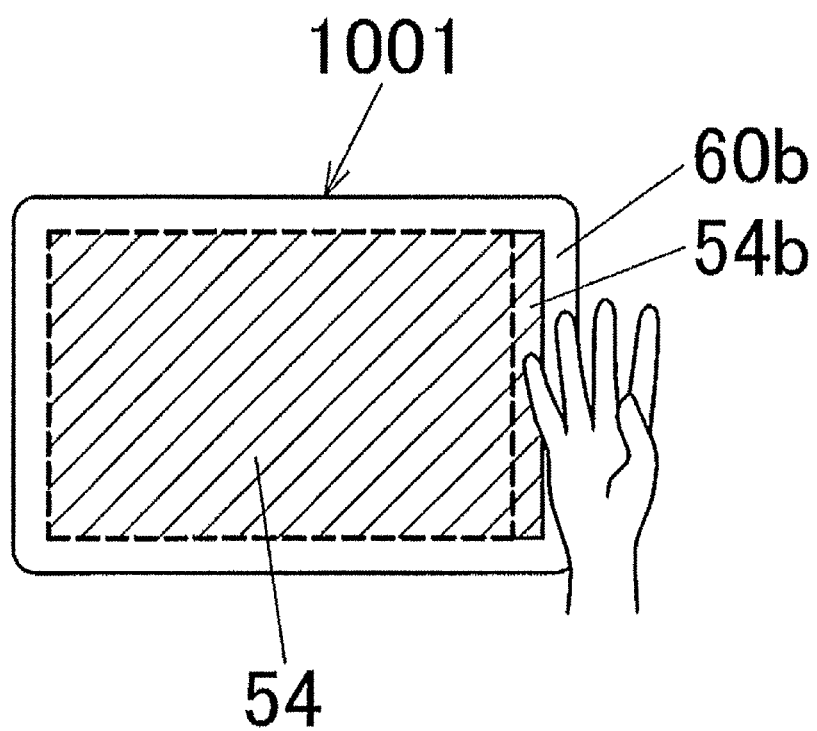
Figure 6C:
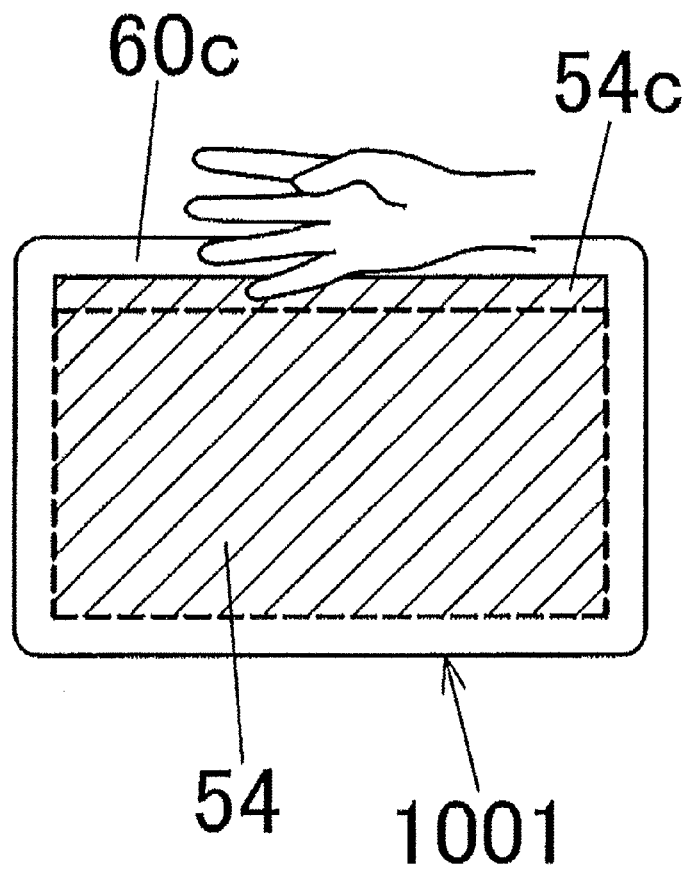
Figure 6D:
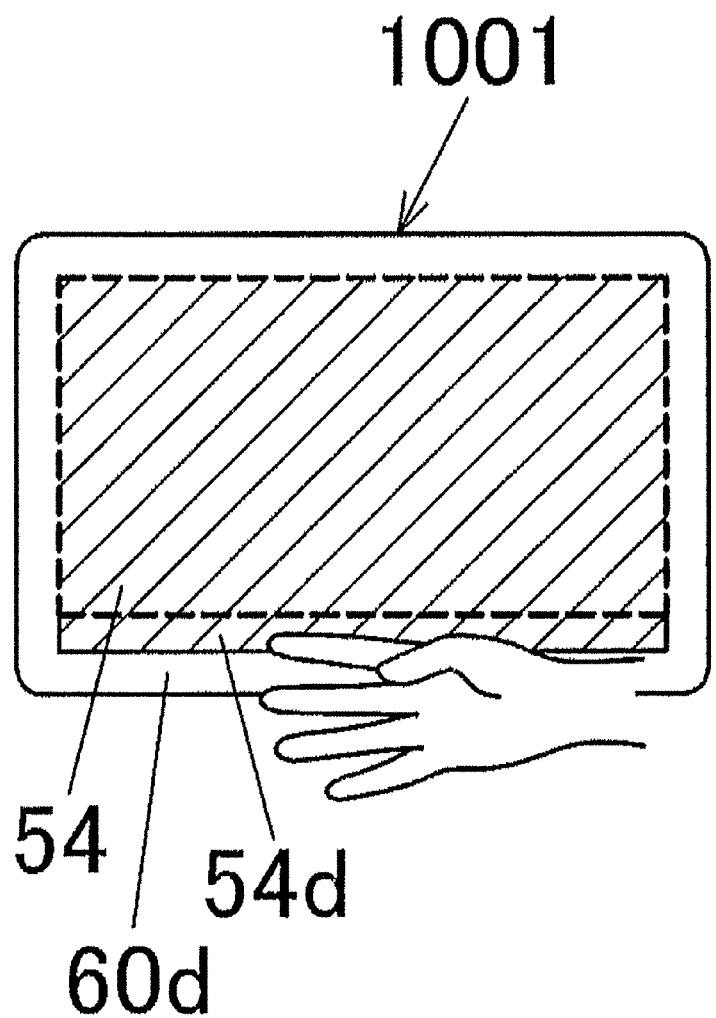

FIG. 6A illustrates that an operator's palm of hand approaches to the side of frame 60*a* on the left; FIG. 6B illustrates that an operator's palm of hand approaches to the side of frame 60*b* on the right; FIG. 6C illustrates that an operator's palm of hand approaches to the side of frame 60*c* on the top; FIG. 6D illustrates that an operator's palm of hand approaches to the side of frame 60*d* on the bottom. In these respective cases: the contact detectable area 54 is reduced horizontally from the left side only by 10-15 millimeters in order to obtain there an undetectable area 54*a* having the same width; the contact detectable area 54 is reduced horizontally from the right side only by 10-15 millimeters in order to obtain there an undetectable area 54*b* having the same width; the contact detectable area 54 is reduced vertically from the upper side only by 10-15 millimeters in order to obtain there an undetectable area 54*c* having the same width; and the contact detectable area 54 is reduced vertically from the lower side only by 10-15 millimeters in order to obtain there an undetectable area 54*d* having the same width. In addition, a graphic area of the liquid crystal display 1000 may also be reduced vertically and horizontally or the graphic area may be simply displaced (positional shift) from a side of frame to which the operator's palm of hand approaching to which is detected, toward the opposite side of frame. Further alternatively, the graphic area may be both reduced and displaced.

Figure 7:
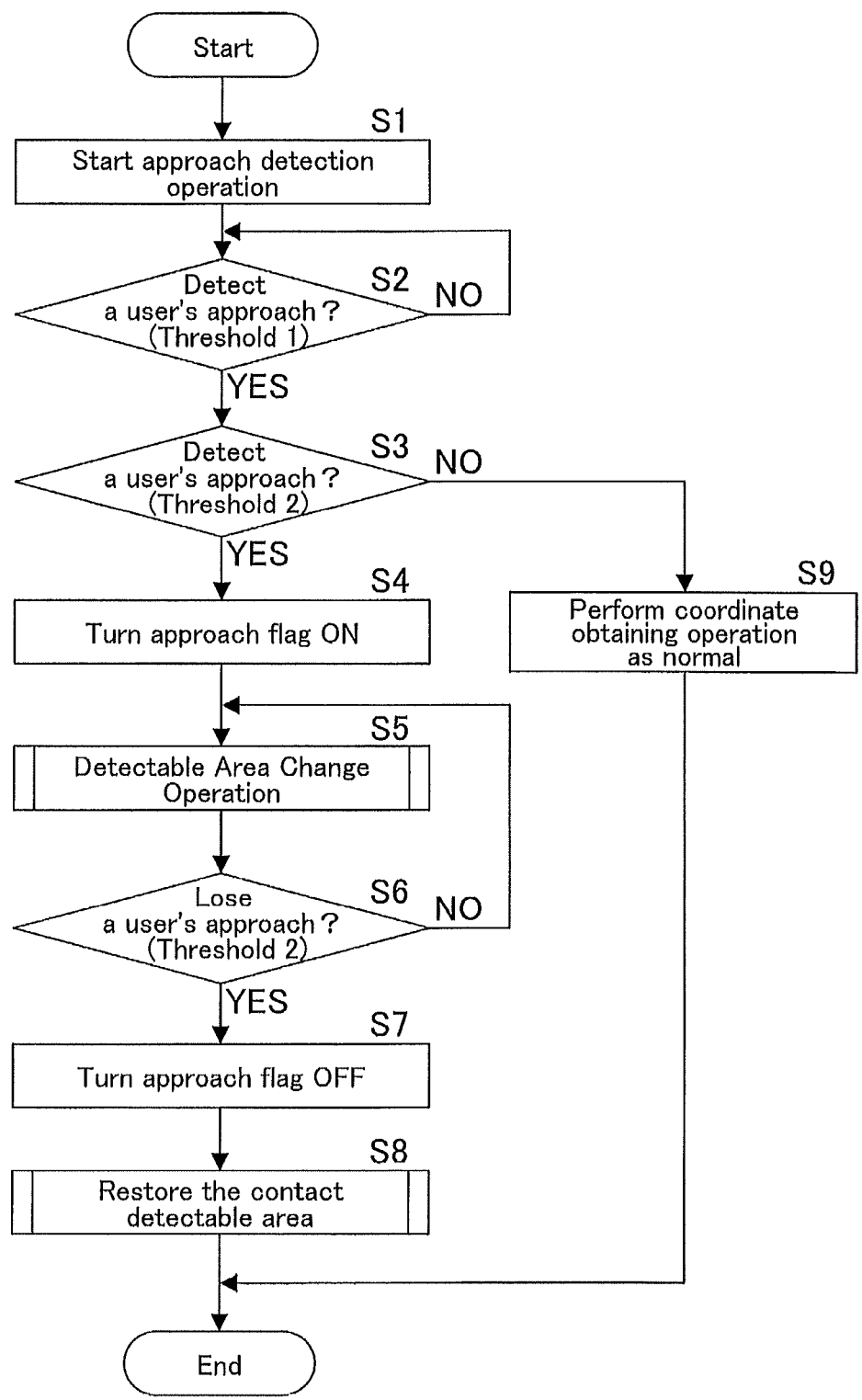
FIG. 7 is a flowchart representing operation of the instruction input device.

Hereinafter, operation of the instruction input device, which is changing the contact detectable area after detecting a user's approach, will be described with reference to the flowchart of FIG. 7.

The processing routine is executed by a CPU of the operation panel controller 106. Alternatively it may be executed by the CPU 101 according to an operation program stored on a recording medium such as a ROM.

When the operation panel 100 is turned on, the approach sensor is reset to start approach detection operation (Step S1). Subsequently it is judged whether or not the capacitance reaches a first threshold, i.e., whether or not a user's palm of hand approaches to the side of frame 60*a*, 60*b*, 60*c*, or 60*d* of the liquid crystal touch panel 1001 (Step S2).

If the capacitance does not reach the first threshold (No in Step S2), the routine stays in Step S2 to continue the judgment operation. If the capacitance reaches the first threshold, i.e., if a user approaches to a side of frame (YES in Step S2), then it is further detected whether or not the capacitance reaches a second threshold which is greater than the first threshold (Step S3). If the capacitance does not reach the second threshold (NO in Step S3), coordinate obtaining operation is performed as normal (Step S9). Then the routine terminates. Meanwhile, if the capacitance reaches the second threshold (YES in Step S3), it is recognized that a user's palm of hand approaches to the side of frame 60*a*, 60*b*, 60*c*, or 60*d*, and the user approach flag for the relevant side of frame is therefore turned on (Step S4). Then detectable area change operation is performed (Step S5). This operation will be described later.

Subsequently, it is judged whether or not the user's palm of hand is now back away from the side of frame, i.e., whether or not the capacitance falls to the second threshold or less (Step S6). If the user's palm of hand still approaches to the side of frame (NO in Step S6), the routine returns to Step S5 to continue the detectable area change operation. In Step S6, it is judged whether or not the capacitance falls to the second threshold or less, at a predetermined interval (every 10 milliseconds, for example) in a repetitive manner. Meanwhile, if the user's hand is now back away from the side of frame (YES in Step S6), the user approach flag is reset (Step S7). And the contact detectable area having been reduced is restored to its original size (Step S8). Then the routine terminates.

Hereinafter, the detectable area change operation in Step S5 of the flowchart of FIG. 7 will be described with reference to the flowchart of FIG. 8.

Figure 8:
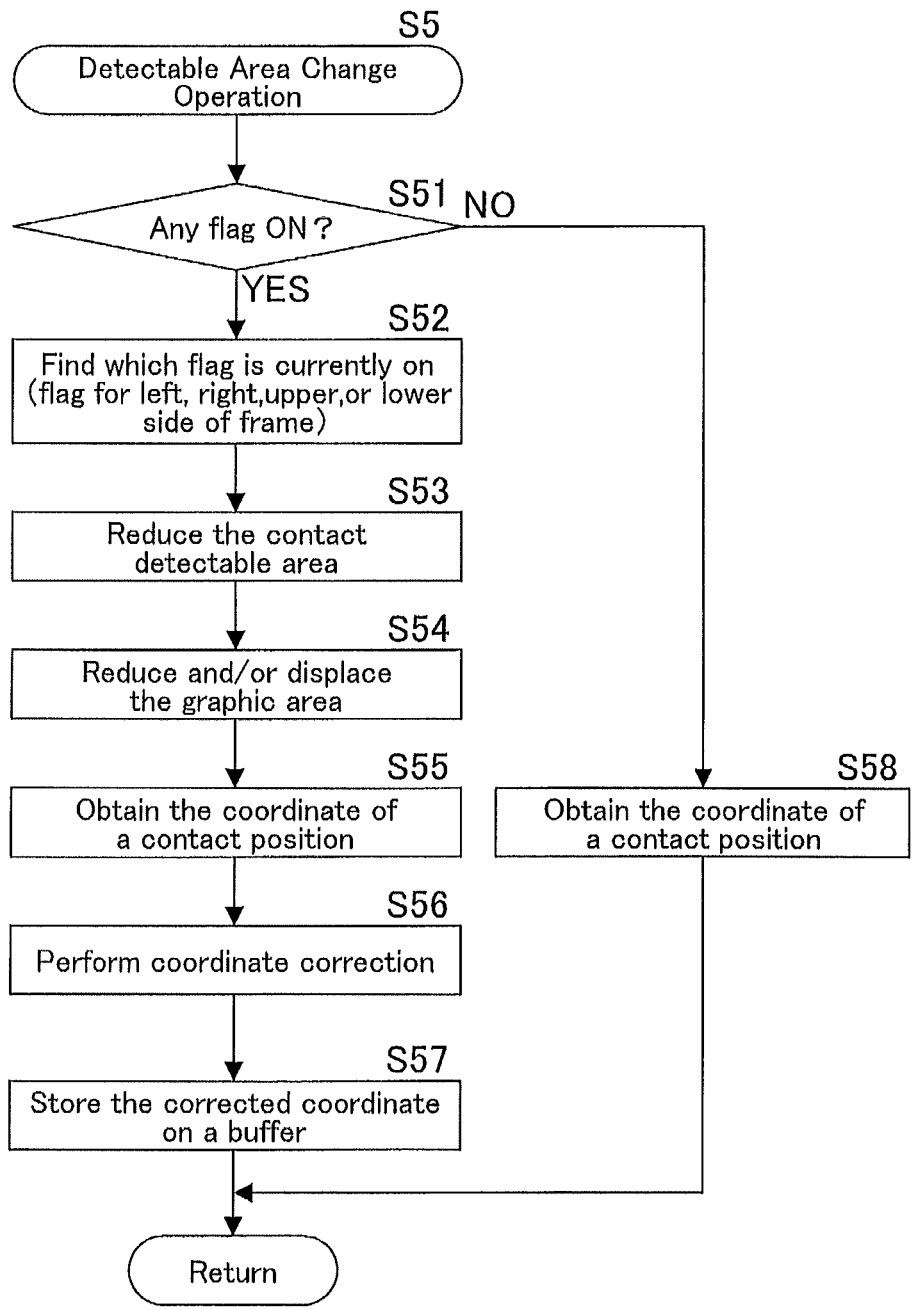
FIG. 8 is a flowchart representing a subroutine to change the contact detectable area (Step S5) from the flowchart of FIG. 7.

In this embodiment, FIG. 8 relates to coordinate obtaining operation of the main routine, which is performed regardless of whether or not the user's palm of hand approaches to a side of frame. Therefore the operation panel controller 106 judges whether or not the user's palm of hand approaches to a side of frame according to the user approach flags (Step S51). If the user's palm of hand does not approach to a side of frame (NO in Step S51), it is recognized that the user's palm of hand would hardly be touching on the touch panel, and the entire contact detectable area 54 is kept as is. The coordinate of a contact position at which the user touches on the touch panel is obtained (Step S58), and the obtained coordinate is stored on a coordinate buffer without correction (Step S57). Then the sub routine returns to the main routine.

Meanwhile, if the user's palm of hand approaches to the a side of frame (YES in Step S51), the user approach flags for the sides of frame 60a, 60b, 60c, and 60d are examined to see which one is currently on (Step S52). Depending on the user approach flag currently being on, the contact detectable area (active area) 54 is reduced vertically or horizontally from the corresponding side of frame (Step S53).

In conjunction with reducing the contact detectable area 54, the graphic area of the liquid crystal display 1000 is reduced and/or displaced (Step S54).

Subsequently, the coordinate of a contact position at which the user touches on the touch panel (an identified coordinate) is obtained (Step S55), and the obtained coordinate is subjected to correction (Step S56). For example, if the obtained coordinate belongs to the undetectable area 54a, 54b, 54c, or 54d, the user's contact is counted out; if the obtained coordinate belongs to the contact detectable area 54, the obtained coordinate is subjected to correction. The corrected coordinate is stored on a coordinate buffer (Step S57). Then the sub routine returns to the main routine of FIG. 7.

On the basis of the corrected coordinate stored on the coordinate buffer, applications perform responding operation.

As described above, if a user's palm of hand approaches to the side of frame 60a, 60b, 60c, or 60d, the contact detectable area 54 is reduced vertically or horizontally from the relevant side of frame in order to obtain an undetectable area. Therefore, when the user accidentally touches at a position of the obtained undetectable area 54a, 54b, 54c, or 54d, the contact is counted out, which prevents mistouch. Furthermore, a user's approach is detected before the user actually touches on the touch panel, and when the user accidentally touches on the touch panel, the contact is counted out quickly. This makes the present invention very advantageous in terms of response sensitivity, compared to the technique to simply judge whether or not a user touches on a touch panel with his/her palm of hand when detecting a contact. And for the high response sensitivity, the present invention is therefore allowed to identify the coordinate of a contact position quickly after detecting a contact.

The present invention having been described above may be applied to the following modes.

[1] An instruction input apparatus comprising:
a display being provided with a display screen;
an electrostatic touch panel being deposited on the front of the display screen on the display, the touch panel being configured to input instructions to the instruction input apparatus;
an approach sensor being configured to detect a user's hand approaching to a part of frame of the touch panel;
a coordinate identification portion being configured to identify the coordinate of a contact position at which the user touches on the touch panel; and
a controller being configured to, if the approach sensor detects the user's hand approaching to the part of frame of the touch panel, change a contact detectable area of the touch panel so that the contact detectable area will exclude the coordinate of the user's contact position which is identified by the coordinate identification portion.

[2] The instruction input apparatus as recited in the aforementioned mode [1], wherein the controller is further configured to make the contact detectable area of the touch panel lose its portion depending on the part of frame the user's hand approaching to which is detected.

[3] The instruction input apparatus as recited in the aforementioned mode [2], wherein the controller is further configured to make the contact detectable area of the touch panel lose its portion depending on the part of frame the user's hand approaching to which is detected.

[4] The instruction input apparatus as recited in the aforementioned mode [3], wherein the controller is further configured to reduce a graphic area of the display screen on the display as well as reducing the contact detectable area of the touch panel.

[5] The instruction input apparatus as recited in the aforementioned mode [3], wherein the controller is further configured to displace a graphic area of the display screen on the display depending on the part of frame the user's hand approaching to which is detected, as well as reducing the contact detectable area of the touch panel.

[6] The instruction input apparatus as recited in any of the aforementioned modes [1] to [5], wherein the controller is further configured to change the contact detectable area of the touch panel when the approach sensor loses the user's hand approaching to the part of frame of the touch panel.

[7] The instruction input apparatus as recited in any of the aforementioned modes [1] to [6], wherein:
the approach sensor is further configured to store a first and second threshold to detect the user's hand approaching to the part of frame of the touch panel, the second threshold being greater than the first threshold; and
the controller is further configured to change the contact detectable area of the touch panel on the basis of a first and second result obtained using the first and second threshold stored on the approach sensor, respectively.

[8] The instruction input apparatus as recited in any of the aforementioned modes [1] to [7], wherein the controller is further configured to restore the contact detectable area of the touch panel having been changed, when the approach sensor loses the user's hand approaching to the part of frame of the touch panel.

[9] The instruction input apparatus as recited in any of the aforementioned modes [2] to [8], wherein the sensor elements of the approach sensor are disposed on a substrate of the touch panel, the substrate having a transparent electrode formed on a surface thereof.

[10] A non-transitory computer-readable recording medium with a program stored thereon to make a computer of an instruction input device comprising:
 a display being provided with a display screen; and
 an electrostatic touch panel being deposited on the front of the display screen on the display, the touch panel being configured to input instructions to the instruction input apparatus, execute:
 detecting a user's hand approaching to a part of frame of the touch panel;
 identifying the coordinate of a contact position at which the user touches on the touch panel; and
 if the user's hand approaching to the part of frame of the touch panel is detected, changing a contact detectable area of the touch panel so that the contact detectable area will exclude an identified coordinate of the user's contact position.

According to the invention as described in the aforementioned mode [1], if a user's hand approaching to a part of frame of the touch panel is detected by the approach sensor, the contact detectable area of the touch panel is changed so that the coordinate of a contact position at which the user touches on the touch panel, which is identified by the coordinate identification portion, will be counted out. Therefore, when a user accidentally touches at a position close to a part of frame of the touch panel while operating the touch panel with his/her palm of hand down customarily, the contact is counted out, which prevents mistouch. Furthermore, a user's approach is detected before the user actually touches at a position close to a part of frame of the touch panel, and when the user accidentally touches at such a position, the contact is counted out quickly. This makes the present invention very advantageous in terms of response sensitivity, compared to the technique to simply judge whether or not a user touches on a touch panel with his/her palm of hand when detecting a contact. And for the high response sensitivity, the present invention is therefore allowed to identify the coordinate of the contact position when detecting a contact.

According to the invention as described in the aforementioned mode [2], the approach sensor is provided with a plurality of sensor elements being configured to detect the user's hand approaching to respective sides of frame surrounding the touch panel completely. And the present invention is therefore allowed to change a part of the contact detectable area depending on the part of frame the user's hand approaching to which is detected, instead of changing the entire contact detectable area unnecessarily.

According to the invention as described in the aforementioned mode [3], the contact detectable area loses its portion depending on the part of frame the user's hand approaching to which is detected. Therefore, when a user accidentally touches at a position close to the part of frame of the touch panel, the contact is counted out.

According to the invention as described in the aforementioned mode [4], when the contact detectable area of the touch panel is reduced, the graphic area of the display screen on the display is reduced as well, and the present invention is therefore allowed to fit the contact detectable area to the graphic area.

According to the invention as described in the aforementioned mode [5], when the contact detectable area of the touch panel is reduced, the graphic area of the display screen on the display is displaced as well, vertically or horizontally dispending on the part of frame the user's hand approaching to which is detected, and the present invention is therefore allowed to fit the contact detectable area to the graphic area.

According to the invention as described in the aforementioned mode [6], the contact detectable area is changed when the approach sensor loses the user's hand approaching to the part of frame of the touch panel. Therefore, when a user accidentally touches on the touch panel, the contact is counted out quickly, which makes the present invention very advantageous in terms of response sensitivity.

According to the invention as described in the aforementioned mode [7], the approach sensor stores a first and second threshold to detect the user's approach, the second threshold being greater than the first threshold, and the contact detectable area is changed on the basis of a first and second result obtained using the first and second threshold, respectively. And the present invention is therefore allowed to detect the user's approach more precisely.

According to the invention as described in the aforementioned mode [8], the contact detectable area is restored when the approach sensor loses the user's hand approaching to the part of frame of the touch panel, and when it seems like that a user would hardly be touching on the touch panel, the contact detectable area is restored to normal quickly.

According to the invention as described in the aforementioned mode [9], the sensor elements of the approach sensor are disposed on a substrate of the touch panel, the substrate having a transparent electrode formed on a surface thereof, which contributes to a simple configuration and lower costs.

According to the invention as described in the aforementioned mode [10], when a user accidentally touches at a position close to a part of frame of the touch panel while operating the touch panel with his/her palm of hand down customarily, the contact is counted out, which prevents mistouch.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An instruction input apparatus comprising:
a display being provided with a display screen;
an electrostatic touch panel being deposited on the front of the display screen on the display, the touch panel being configured to input instructions to the instruction input apparatus;
an approach sensor being configured to detect a user's hand approaching to a part of a frame of the touch panel before the user's hand touches the part of the frame or the touch panel;
a coordinate identification portion being configured to identify the coordinate of a contact position at which the user touches the touch panel; and
a controller being configured to, if the approach sensor detects the user's hand approaching to the part of the frame of the touch panel, change a contact detectable area of the touch panel so that the contact detectable area will exclude the coordinate of the user's contact position which is identified by the coordinate identification portion.

2. The instruction input apparatus as recited in claim 1, wherein the approach sensor is provided with a plurality of sensor elements for respective parts of the frame surrounding the touch panel completely, the sensor elements being configured to detect the user's hand approaching to the respective parts of the frame.

3. The instruction input apparatus as recited in claim 2, wherein the controller is further configured to make the contact detectable area of the touch panel lose its portion depending on which part of the respective parts of the frame the user's hand approaching to is detected.

4. The instruction input apparatus as recited in claim 3, wherein the controller is further configured to reduce a graphic area of the display screen on the display as well as reducing the contact detectable area of the touch panel.

5. The instruction input apparatus as recited in claim 3, wherein the controller is further configured to displace a graphic area of the display screen on the display depending on the part of the frame the user's hand approaching to which is detected, as well as reducing the contact detectable area of the touch panel.

6. The instruction input apparatus as recited in claim 1, wherein the controller is further configured to change the contact detectable area of the touch panel when the approach sensor loses the user's hand approaching to the part of the frame of the touch panel.

7. The instruction input apparatus as recited in claim 1, wherein:
the approach sensor is further configured to store a first and second threshold to detect the user's hand approaching to the part of the frame of the touch panel, the second threshold being greater than the first threshold; and
the controller is further configured to change the contact detectable area of the touch panel on the basis of a first and second result obtained using the first and second threshold stored on the approach sensor, respectively.

8. The instruction input apparatus as recited in claim 1, wherein the controller is further configured to restore the contact detectable area of the touch panel having been changed, when the approach sensor loses the user's hand approaching to the part of the frame of the touch panel.

9. The instruction input apparatus as recited in claim 2, wherein the sensor elements of the approach sensor are disposed on a substrate of the touch panel, the substrate having a transparent electrode formed on a surface thereof.

10. A non-transitory computer-readable recording medium with a program stored thereon to make a computer of an instruction input device comprising:
a display being provided with a display screen; and
an electrostatic touch panel being deposited on the front of the display screen on the display, the touch panel being configured to input instructions to the instruction input apparatus,
execute:
detecting a user's hand approaching to a part of a frame of the touch panel before the user's hand touches the part of the frame or the touch panel;
identifying the coordinate of a contact position at which the user touches on the touch panel; and
if the user's hand approaching to the part of the frame of the touch panel is detected, changing a contact detectable area of the touch panel so that the contact detectable area will exclude an identified coordinate of the user's contact position.

* * * * *